United States Patent [19]

Wirfelt

[11] 3,838,500
[45] Oct. 1, 1974

[54] CUTTING TOOL
[75] Inventor: Sven Axel Olof Wirfelt, Sandviken, Sweden
[73] Assignee: Sandvik Aktiebolag, Sandviken, Sweden
[22] Filed: Mar. 26, 1973
[21] Appl. No.: 344,541

[52] U.S. Cl.......................... 29/568, 29/26, 82/36 R
[51] Int. Cl............................................. B23b 27/16
[58] Field of Search ........... 29/26, 568, 96; 82/36 R

[56] References Cited
UNITED STATES PATENTS
2,883,890  4/1959  Fink et al................................ 29/26
2,997,901  8/1961  Keck et al............................... 29/26
3,793,708  2/1974  Watanabe et al....................... 29/568

FOREIGN PATENTS OR APPLICATIONS
179,715    4/1966   U.S.S.R..................................... 29/26
1,021,756  12/1957  Germany................................ 30/40.2

Primary Examiner—Andrew R. Juhasz
Assistant Examiner—W. R. Briggs
Attorney, Agent, or Firm—Pierce, Scheffler & Parker

[57] ABSTRACT

A cutting tool, of the type wherein an indexible cutting insert is localized and retained against a bottom surface and complementary side supports in an insert-receiving site in the body of the tool, is provided with a magazine — to hold a supply of cutting inserts — and means for rejecting a worn insert from said site and for replacing the same with a fresh insert from such supply.

10 Claims, 10 Drawing Figures

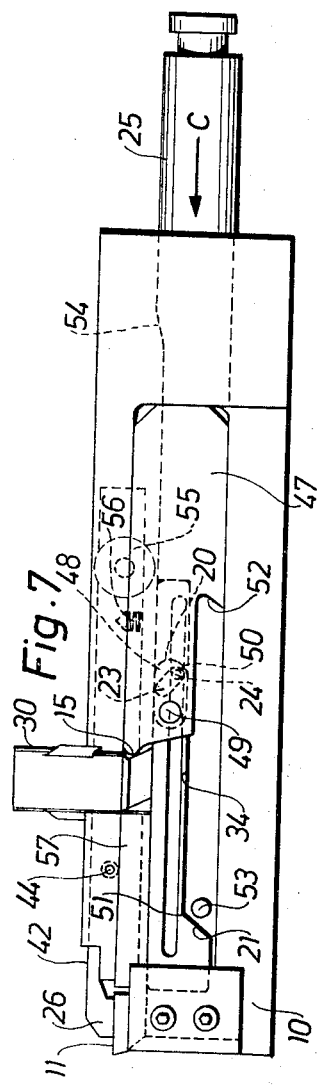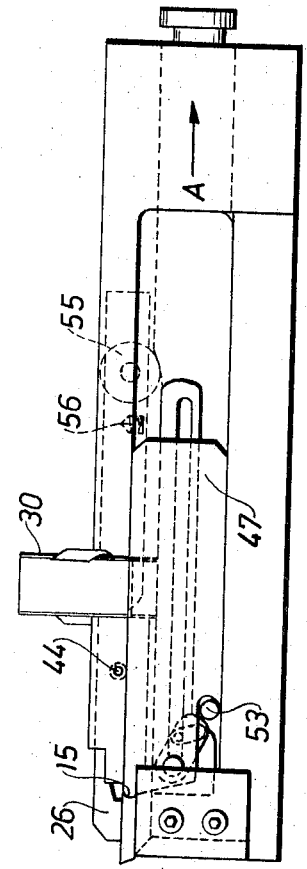

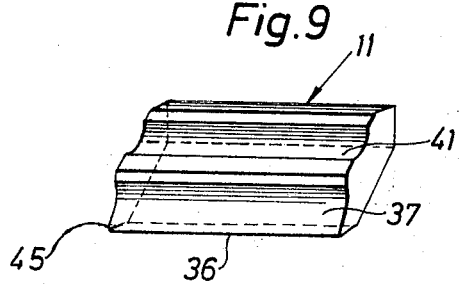
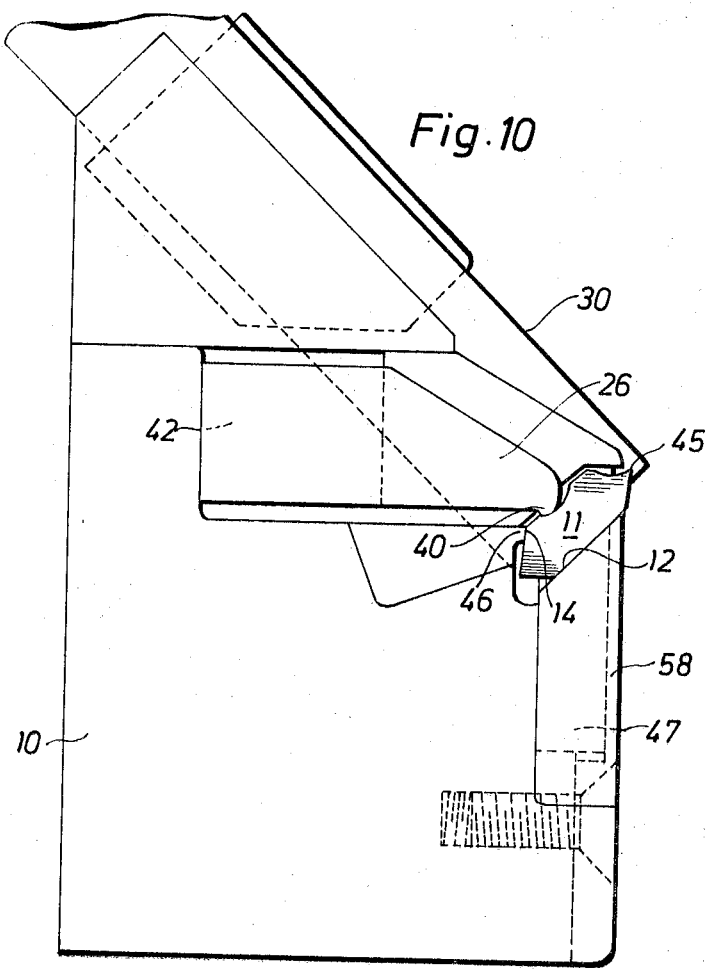

CUTTING TOOL

This invention relates to a cutting tool for chip cutting operations of metals or other materials which cutting tool is shaped for localization and retention of an indexible cutting insert against a bottom surface and complementary side supports in an insert-receiving site in the tool body.

In all metal cutting work there is a successive wear of the cutting edge which necessitates indexing thereof after a certain length of time. In the use of conventional tool holders such indexing operations cause frequent interruptions to the normal function of the machine tool. A manual operation is required for loosening and re-clamping of clamping means, etc. As such indexing operations do not only require a relatively expensive manual operation but also a standstill of the machine tool they constitute an essential problem as to cost of production.

An object of the present invention is the provision of a cutting tool having means for mechanically indexing the cutting insert within such a short length of time that the indexing can take place when the cutting tool is out of engagement with the workpiece. To this end there is provided, according to the invention, a cutting tool of the aforementioned type which is mainly characterized in that at least one of said side supports is arranged on a first movable means, said first movable means being disposed to feed a new insert from a magazine in the tool body to said site in the tool body preferably by axial displacement of said first means, said first movable means being arranged to cooperate with a second movable means at the end of said feed movement, said second movable means being provided with a clamping means so as firmly to clamp said insert after the feed thereof into its site in the tool body.

The invention will now be more specifically described, with reference to the accompanying drawings in which FIG. 1 is a section, taken on line I—I of FIG. 2 of a cutting tool according to the invention;

FIG. 7 is a side view of an alternative embodiment of the invention;

FIG. 8 is a side view of the embodiment shown in FIG. 7, but showing the indexing mechanism in another position;

FIG. 9 is an elevational view showing a cutting insert adapted for localization and retention in the embodiment shown in FIGS. 7–8; and FIG. 10 is an end view of the embodiment shown in FIGS. 7–8.

In the following description analogous parts in the embodiments shown have been given identical reference numerals.

Figure 1:
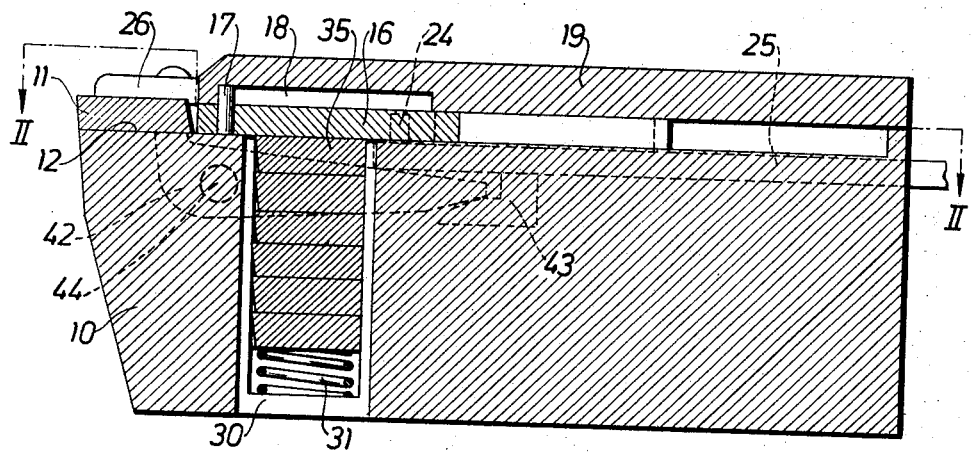

Referring to the figures, a toolholder 10 is formed at one end thereof with a site to receive a cutting insert 11, said site having a bottom surface 12 and side supports in two directions. One of said side supports preferably comprises two location members 13 and 14 in the form of protrusions in a side support surface confining the site in the holder 10, the other side support comprising one or more location members 15 formed as protrusions in the end surface of a movable arm 16 which forms part of the indexing mechanism of the toolholder. The insert is clamped on the top by a clamping plate 26.

Figure 2:
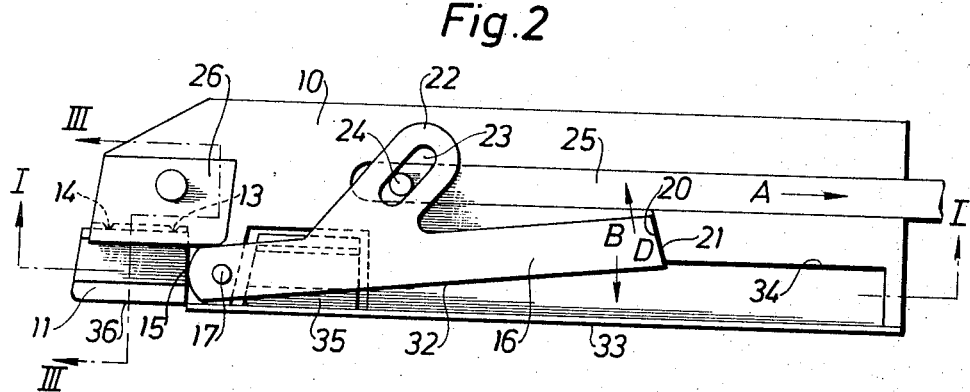
FIG. 2 is a sectional view, taken on line II—II in FIG. 1.
Figure 3:
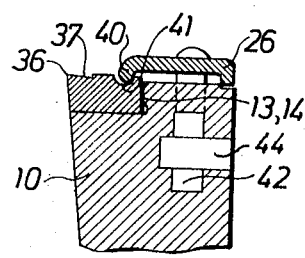
FIG. 3 is a section, taken on line III—III in FIG. 2.

Arm 16 is movable, but provides a firm side support to the insert in the position shown in FIG. 2. Arm 16 is provided with an upwardly extending pin 17 at its end surface 15, which pin engages into a slot 18 oriented in the longitudinal direction of the toolholder, said slot being provided in a cover plate 19. In the position shown in FIG. 2, the opposite end 20 of said arm 16 rests against a support surface 21 in the toolholder, thus preventing axial displacement of arm 16, and, due to this arrangement, the surface 15 is fixed in that position and thus provides a firm side support to insert 11. Arm 16 is also provided with a projecting part 22 having a slot 23 in it, in which slot a pin 24 provided on a bar 25 engages, said bar 25 being displaceable in the longitudinal direction of the toolholder.

The shank of the holder is provided, beside the insert-receiving site, with a magazine 30 for a supply of fresh cutting inserts, said magazine being configured as a vertically extending, open recess in the bottom of which there is disposed a spring element 31 adapted to press the inserts upwardly. Magazine 30 is situated beneath slot 18.

Figure 4:
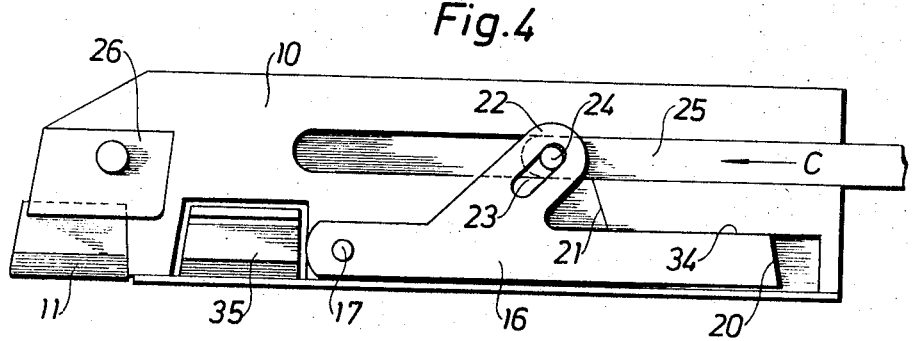
FIG. 4 is a sectional view, taken on line II—II in FIG. 2, but showing the indexing mechanism in another position than that already shown in FIG. 2.
Figure 5:
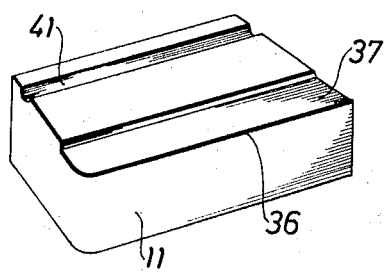
FIG. 5 is an elevational view showing a cutting insert adapted for localization and retention in the holder thus shown.

When it is desired to exchange a cutting insert, the indexing mechanism disclosed above functions in the following manner. Bar 25 is axially displaced in the direction of the arrow "A" (FIG. 2). Slot 23 is so directed that when pin 24 is moved by axially displacing bar 25, arm 16 is pivoted in the direction of the arrow "B" under wedging action between pin 24 and slot 23. Arm 16 is not displacement axially as long as its end surface 20 is in engagement with the support surface 21. When arm 16 has been pivoted so that its side portion 32 rests against a support plate 33, end surface 20 is out of engagement with surface 21, and the continued movement of bar 25 in the direction of the arrow "A" then results in an axial displacement of arm 16 in the direction of arrow "A", at which arm 16 is steered by pin 17 along slot 18 and by walls 33 and 34. This movement is continued until end surface 15 of arm 16 has passed over the magazine 30 to the position shown in FIG. 4. By this the opening of the magazine is laid bare, thus enabling spring 31 to press up the inserts therein so as to place the uppermost insert 35 flush with insert 11 in the site.

When re-displacing the bar 25 in the direction of arrow "C" (FIG. 4), arm 16 is brought with it while pushing the new insert 35 in front of it. By this displacement insert 35 pushes out insert 11 from the site and takes the seat thereof.

Figure 6:
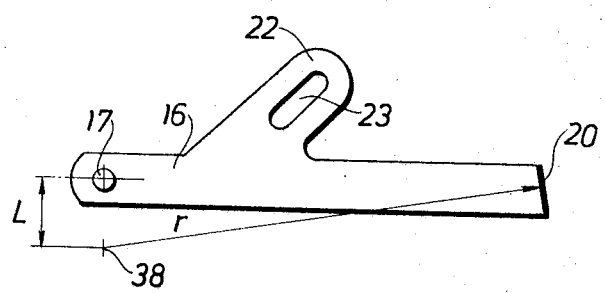
FIG. 6 is an elevational top view of a member forming part of the indexing mechanism.

When arm 16 has reached its foremost end position it is, due to wedging action between pin 24 and slot 23, pivoted back to the position shown in FIG. 2, and hence surface 20 is brought into engagement with surface 21. Surface 20 is cylindrically shaped, having its middle point 36 at a distance "L" from pin 17 (FIG. 6), so that arm 16 at its turning in direction "D" is further displaced forwards until pin 17 has reached the end portion of slot 18. In this position arm 16 is accurately fixed and engaged with its end surface 20 in abutting relationship with support surface 21, end surface 15 thus presenting a firm side support to insert 11. The pressure with which the insert abuts against surface 15 during cutting does not alter the position of arm 16, because the distance "L" is so small that the contact between surfaces 20 and 21 is self-locking.

Clamping plate 26, positioned on top of insert 11, has a protrusion 40 adapted to engage in a spout-formed recess 41 of the insert, said plate 26 being mounted on a movable arm 42 which is pivotable around a pin 44. At the end of the movement of bar 25 in direction "C," arm 42 is influenced by a locking heel 43 on the bar 25, thus squeezing insert 11 in its site. The protrusion 40 should abut against the side of the recess 41 that is situated nearest the location members 13 and 14, and the contact surface should be inclined at least 45° to the underneath side of said insert in order to ensure that said insert is pressed against its location members. In the embodiment shown, recess 41 is oriented parallel to the main cutting edge 36, along which is provided a chip breaker 37.

Instead of making arm 16 laterally displaceable to lock the same against axial displacement it is possible, for instance, to make the arm capable of being turned and provide it with abutments which may be adapted to engage with correspondingly shaped surfaces in shank 10 in the turning movement of the arm.

Referring now to the alternative embodiment shown in FIGS. 7-10, a toolholder 10 is provided with a site at one end thereof for the reception of a cutting insert 11, said insert being provided with a main cutting edge 36 having a nose radius 45, a chip breaker 37 adjoining thereto and a recess 41 for the reception of a clamping plate 26. The site in holder 10 comprises a bottom surface 12 and side supports in two directions. The side supports in one direction may be formed as one or several support surfaces extending in the same plane.

In this embodiment the side supports in one direction are developed as a support surface 14 on a list 46, the bottom surface 12 of the site being obliquely disposed at an acute angle of 30°-70°, preferably 35°-45°, with respect to the plane of said support surface 14 provided on said list 46. The other side support comprises a location member formed as a protrusion 15 on the end surface of a plate 47, said plate 47 being axially displaceable in holder 10 by means of a bar 25. Plate 47 is movable, but is adapted to provide a side support to insert 11 in the position shown in FIG. 8.

Referring now to FIGS. 7-8, plate 47 is shown with its protrusion 15 in position behind an insert which is exposed from a magazine 30, a spring being provided in the upper end portion of said magazine 30 to press the inserts outwardly, i.e., downwardly as seen in FIGS. 7-8. The plate 47 is axially displaced in the direction "C" by means of a bar 25 and a pin 24 thereon, said pin 24 engaging in a slit 23 in an element 48, said element 48 also being provided with a pin 49 which engagingly cooperates with an aperture in plate 47. Element 48 is incapable of being turned, although pin 24 acts against one side wall of slit 23. Plate 47 thus continues its forward movement until a corner 50 on element 48 has passed the corner 51 of support surface 21 in holder 10. Immediately thereupon a support surface 52 on said plate 47 will abut against a fixed pin 53. Due to the action of pin 24 against slit 23, element 48 is turned until the support surface 20 thereon is brought into engagement with the corresponding support surface 21 in the holder. The support surface 20 is cylindrically shaped with its middle point situated at some distance above the middle point of the pin 49, thus accomplishing a wedging action between surfaces 20 and 21 so as effectively to lock plate 47 in its foremost position while making element 48 self-locking against forces acting upon plate 47 via its protrusion 15. Due to this arrangement, all back-lash between the different movable elements is eliminated, and by this insert 11 obtains a solid side support against cutting forces acting thereon, which is of utmost importance for the dimensional accuracy attainable on the workpiece with which the insert engages.

When element 48 has been turned and locking is obtained in the above-mentioned manner, the forward movement of pin 24 is terminated. Pin 24 is, via a spring device, attached to bar 25 so that when the bar continues its forward movement pin 24 will act upon one side wall in slit 23 with increased spring action while an oblique surface 54 on the bar 25 is brought into contact with a rotatable wheel 55 which is fastened to movable arm 42, said arm 42 being pivotable around a pin 44 and spring-biased via a spring 56. Wheel 55 thus moves upwardly along surface 54, which movement results in a downward movement of the clamping plate 26 fastened to arm 42, thus accomplishing clamping of the insert 11 in its site against the bottom surface 12.

The insert is steered, during its feed forwardly, in a longitudinal recess 57 in the holder which recess is so configured that the insert is obliquely disposed therein during the feed, said obliqueness corresponding to that of bottom surface 12 in the insert-receiving site in holder 10. Insert 11 is steered in said oblique position by the upper end surface of a cover plate 58, which is removed in FIGS. 7-8, said end surface being oblique in correspondence with the obliqueness of bottom surface 12 and rests against the bottom surface of insert 11 during its feed movement.

During its feed movement movable arm 42 is slightly spring-biased by a spring 56, and clamping plate 26 acts upon insert 11 with a small pressure only, so as to facilitate the old insert being pushed out by the new insert thus brought forward to its location. When bar 25 is brought backwardly, wheel 55 sinks down again while being in contact with the oblique surface 54, thus relieving the pressure acting upon insert 11 in its site. Pin 24 will then act against the opposite wall of slit 23, thus turning the element 48 so that surface 20 on the same will be brought out of engagement with surface 21. Plate 47, as well as the accompanying element 48, may then freely be axially displaced in the direction "A."

I claim:

1. Cutting tool, for chip cutting operations of metals and other materials, having means for automatically replacing cutting inserts, comprising:
   a toolholder (10) having a forward end with an insert-receiving site formed thereon, said site presenting a bottom surface (12) and complementary side support;
   a cutting insert (11) rested in said site against said bottom surface (12) and complementary side supports, said insert having a cutting edge (36) formed upon its upper surface;

a magazine (30) arranged on the tool and containing a stack of cutting inserts, said magazine having an open end for exposing the inserts, one by one, when the first movable means is reciprocated a certain distance away from said site, said magazine located with respect to the insert rested in said site;

a first movable means (16, 47) reciprocatable toward and away from said site, the lead end of which first movable means representing one of said side supports arranged for end abutment with the insert exposed from the magazine for effecting a feed movement wherein the exposed insert is fed in a linear path thereby removing the insert initially rested in said site and replacing the same with the exposed insert; and a second movable means (42) actuatable by said first movable means such that movement of the first movable means in a direction away from said site releases said insert located in said site and, at the end of said feed movement, the lead end of said second movable means having a clamping means (26) so as to clamp the fed insert downwards against said bottom surface of said site at said feed movement caused by said first reciprocal means.

2. Cutting tool according to claim 1, wherein the first movable means arranged for the feed of said cutting inserts comprises an element (16, 48), which is adapted to be pivoted at the end of the feed movement so as to bring a support surface (20) thereon into locking engagement with a correspondingly shaped support surface (21) in the tool body, thereby enabling the cutting forces to be taken up thereof.

3. Cutting tool according to claim 2, in which said first movable means comprises an element (25) which is axially displaceable in the tool body and is provided with a pin member (24), said pin member being disposed engagingly to cooperate with a corresponding recess (23) in said pivotable element (16, 48) so as to accomplish the feed movement thereof.

4. Cutting tool according to claim 2, wherein said first movable means comprises an element (25) which is reciprocal in the tool body and is provided with a pin (24) disposed to engage a slot (23) in the pivoted element (16, 48) so as to effect the required movement thereof.

5. Cutting tool according to claim 1, wherein the first movable means is provided with a cam surface disposed to cooperate with a cam follower of said second movable means so as to cause a pivoting movement to the latter about an axis (44) for urging its clamping means (26) downwards thus clamping the insert (11) against the bottom surface (12) in said site.

6. Cutting tool according to claim 2, according to which the support surfaces (20, 21) disposed for locking engagement with each other are cylindrically shaped.

7. Cutting tool according to claim 1, wherein the clamping means (26) is in the form of a clamping plate provided with a protrusion (40) for cooperation with a corresponding recess (41) in the insert (11).

8. Cutting tool according to claim 1, according to which the feed movement is substantially parallel to the main cutting edge of the insert.

9. Cutting tool according to claim 1, in which the side support of said insert in one direction is in the form of a support surface (14), the bottom surface (12) of the site being obliquely disposed at an acute angle of 30°–70° with respect to the plane of said side support surface (14).

10. Cutting tool according to claim 1, in which the insert-receiving magazine (30) extends substantially perpendicular to the extension of said support surface (12).

* * * * *